(12) United States Patent
Delchambre et al.

(10) Patent No.: US 10,267,110 B2
(45) Date of Patent: Apr. 23, 2019

(54) TOOL FOR THE STIMULATION OF WELLS COMPRISING CAPACITIVE ELEMENTS ELECTRICALLY IN PARALLEL

(71) Applicant: ENE29 S.AR.L., Luxembourg (LU)

(72) Inventors: Michael Delchambre, Toulouse (FR); Salvador Moncho, Malakoff (FR)

(73) Assignee: ENE29 S.AR.L., Luxembourg (LU)

( * ) Notice: Subject to any disclaimer, the term of this patent is extended or adjusted under 35 U.S.C. 154(b) by 56 days.

(21) Appl. No.: 15/106,327

(22) PCT Filed: Dec. 19, 2014

(86) PCT No.: PCT/EP2014/078693
§ 371 (c)(1),
(2) Date: Jun. 20, 2016

(87) PCT Pub. No.: WO2015/091927
PCT Pub. Date: Jun. 25, 2015

(65) Prior Publication Data
US 2017/0002617 A1 Jan. 5, 2017

(30) Foreign Application Priority Data

Dec. 20, 2013 (FR) ...................................... 13 63228

(51) Int. Cl.
*E21B 28/00* (2006.01)
*E21B 43/00* (2006.01)
(Continued)

(52) U.S. Cl.
CPC ............ *E21B 28/00* (2013.01); *E21B 43/003* (2013.01); *H01G 4/385* (2013.01); *H02J 7/0024* (2013.01); *E21B 47/14* (2013.01); *H02J 7/345* (2013.01)

(58) Field of Classification Search
CPC ..... E21B 43/2401; E21B 43/003; E21B 28/00
(Continued)

(56) References Cited

U.S. PATENT DOCUMENTS 3,456,157 A * 7/1969 Beemer .................... H01C 1/02
174/94 R
4,345,650 A * 8/1982 Wesley ................... E21B 36/04
166/177.2
(Continued)

FOREIGN PATENT DOCUMENTS

| DE | 10 2004 039 231 A1 | 2/2006 |
|---|---|---|
| EP | 2 426 311 A2 | 3/2012 |
| WO | 90/13830 A1 | 11/1990 |

OTHER PUBLICATIONS

International Search Report, dated Feb. 3, 2015, from corresponding PCT application.

*Primary Examiner* — Janine M Kreck
(74) *Attorney, Agent, or Firm* — Young & Thompson

(57) ABSTRACT

A tool (200) for stimulation of wells, includes an electrical supply port, a stimulation head (210) and at least two capacitive elements (205a-205c) between the supply port and the stimulation head, each capacitive element including two terminals (Bp, Bn) with respectively different polarities arranged on the respectively opposed connection faces of the capacitive element, the poles of the capacitive elements (205a-205c) having the same polarity being connected together in such a way that the capacitive elements are electrically in parallel. Advantageously, the capacitive elements (205a-205c) of the tool (200) are arranged in series with their connection faces facing each other, and in such a way that the connection faces facing each other of each adjacent pair or capacitive elements correspond to terminals of the same polarity.

16 Claims, 2 Drawing Sheets

(51) Int. Cl.
*H01G 4/38* (2006.01)
*H02J 7/00* (2006.01)
*E21B 47/14* (2006.01)
*H02J 7/34* (2006.01)

(58) Field of Classification Search
USPC .................................. 166/248, 249, 177.6
See application file for complete search history.

(56) References Cited

U.S. PATENT DOCUMENTS

| | | |
|---|---|---|
| 4,479,680 A | 10/1984 | Wesley et al. |
| 6,549,098 B1 | 4/2003 | Bernard |
| 2005/0168911 A1 | 8/2005 | Staib |
| 2014/0301017 A1* | 10/2014 | Diehl ...................... E21B 36/04 361/301.4 |
| 2015/0308249 A1* | 10/2015 | Delchambre ......... E21B 43/003 166/65.1 |
| 2015/0349497 A1* | 12/2015 | Delchambre ............. H01T 1/22 315/39 |

* cited by examiner

TOOL FOR THE STIMULATION OF WELLS COMPRISING CAPACITIVE ELEMENTS ELECTRICALLY IN PARALLEL

TECHNICAL FIELD

The present invention belongs to the field of well stimulation, and more particularly relates to a tool for the stimulation of wells.

The term "well stimulation" refers to generating an acoustic shock wave in a natural well or wellbore. Well stimulation is notably undertaken to improve the production of an underground resource extraction well (oil, natural gas, water, etc.), to conduct a seismic survey by measuring the acoustic wave (e.g. by means of a surface acoustic sensor), to fracture underground rock, etc.

STATE OF THE ART

In the field of well stimulation, it is known practice to use a device comprising an elongated tool adapted to be inserted into a well obtained by drilling. Such stimulation devices are known, for example, from:
  U.S. Pat. No. 4,345,650, which describes a stimulation device used to improve the production of an underground resource extraction well,
  international patent application WO9013830, which describes a stimulation device used to conduct a seismological study,
  U.S. Pat. No. 4,479,680, which describes a stimulation device used to fracture underground rock.

Figure 1:
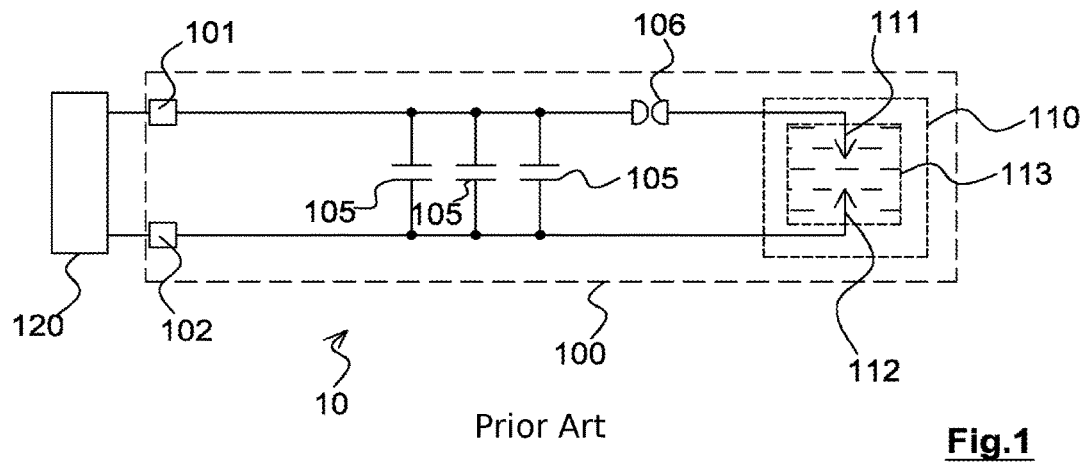

FIG. 1 shows an electric circuit diagram of an exemplary stimulation device 10 comprising a tool 100 according to the prior art.

As illustrated in FIG. 1, the tool 100 comprises a stimulation head 110 in the shape of a closed cavity 113 inside of which a first electrode 111 and a second electrode 112 are located. The first electrode 111 and the second electrode 112 are separated by water contained inside said cavity 113.

The first electrode 111 and the second electrode 112 are connected to a first terminal 101 and a second terminal 102, respectively, of the tool 100, on the outside of the cavity 113 of the stimulation head 110. The tool 100 also comprises a set of capacitive elements 105 which are electrically connected in parallel with each other and with the stimulation head 110.

The tool 100 illustrated in FIG. 1 also comprises a spark-gap 106 arranged between the capacitive elements 105 and the stimulation head 110. The spark-gap 106 primarily comprises two states:
  an open state wherein the capacitive elements 105 are disconnected from the stimulation head 110, so that no electric current can flow between said capacitive elements 105 and said stimulation head 110,
  a closed state wherein the capacitive elements 105 are connected to the stimulation head 110, so that an electric current can flow between said capacitive elements 105 and said stimulation head 110.

Thus, by connecting a power source 120 to the first terminal 101 and to the second terminal 102 of the tool 100, the capacitive elements 105 are charged when the spark-gap 106 is in the open state, until a predetermined voltage is obtained at the terminals of all of said capacitive elements 105. The spark-gap 106 then passes to the closed state, and the voltage at the terminals of the capacitive elements is applied to the stimulation head 110. The capacitive elements 105 discharge, through the stimulation head, by circulating a pulse of high-intensity current (possibly exceeding one hundred kilo-amperes) in the fluid separating the first electrode 111 from the second electrode 112. This pulse of high-intensity current creates an acoustic shock wave that propagates in the well, for example via a flexible wall of the cavity 113. Such an acoustic shock wave can notably be used to improve the production of an underground resource extraction well, to conduct a seismic survey, and to fracture underground rock, etc.

During well stimulation operations, the tool 100 is inserted into said well with the stimulation head 110 downwards, and is lowered to the point where the stimulation is to be performed. Once the stimulation point is reached, the well can be stimulated by successive charges/discharges of the capacitive elements 105.

However, a design difficulty of the tool 100 arises from the fact that the levels of voltage considered are very high (several tens of kilovolts), in order to effectively stimulate the well, while said tool must be relatively narrow (with a diameter in the order of ten centimeters), in order to allow it to be inserted into a well obtained by drilling. Therefore, there is a significant risk of electrical arcs forming inside the tool 100, upstream from the stimulation head 110.

PRESENTATION OF THE INVENTION

The present invention aims to offer an arrangement of capacitive elements of the tool which makes it possible to limit the risk of electrical arcing inside the tool.

For this reason, the present invention relates to a well stimulation tool comprising a power supply port, a stimulation head and at least two capacitive elements between said power supply port and said stimulation head, each capacitive element comprising two terminals of respectively different polarities arranged on respectively opposite connection faces of said capacitive element, the terminals of the same polarity of said capacitive elements being connected together so that said capacitive elements are electrically in parallel. In addition, the capacitive elements of the tool are arranged in series with their connection faces facing each other, and such that the connection faces facing each other of each pair of adjacent capacitive elements correspond to terminals of the same polarity.

Thus, as the capacitive elements are arranged in series with their connection faces facing each other, it is understood that the minimum distance between terminals of separate capacitive elements corresponds to the distance between the terminals arranged on facing connection faces of each pair of adjacent capacitive elements. However, as they are the same polarity, there is no risk of electrical arcing. The minimum distance between terminals of different polarities of separate capacitive elements is also greater than the length of a capacitive element.

In specific embodiments, the stimulation tool may comprise one or more of the following characteristics, considered individually or in all technically possible combinations.

In specific embodiments, the remote terminals of the same polarity of each pair of adjacent capacitive elements are connected by at least one link extending along said pair of adjacent capacitive elements.

In specific embodiments, the stimulation tool comprises at least three capacitive elements, and the links connecting the terminals of different polarities of a same capacitive element to the respective terminals of other capacitive elements are radially spaced by an angle equal to or greater than 60°.

In specific embodiments, the remote terminals of the same polarity of each pair of adjacent capacitive elements are connected by two links extending along said pair of adjacent capacitive elements and radially spaced by an angle equal to 180° or between 10° and 90°.

In specific embodiments, the stimulation tool comprises electrical insulation means between each link of each pair of adjacent capacitive elements and electrical connection means of the terminals of the same polarity of the connection faces facing each other of said pair of adjacent capacitive elements.

In specific embodiments, each link connecting the remote terminals of the same polarity of each pair of adjacent capacitive elements is rigid.

In specific embodiments, each link connecting the remote terminals of the same polarity of each pair of adjacent capacitive elements is flexible, and the capacitive elements are maintained inside a rigid peripheral wall of the tool by a resin.

In specific embodiments, the terminals of the same polarity facing each pair of adjacent capacitive elements are connected by flexible electrical connection means.

In specific embodiments, the stimulation tool comprises spacers between the adjacent capacitive elements.

In specific embodiments, the capacitive elements are arranged inside an electrically conductive peripheral wall of the tool, and said tool comprises electrical insulation means between said peripheral wall and said capacitive elements.

In specific embodiments, the tool is formed by a plurality of sections assembled end to end in a reversible manner, one of the sections comprising a plurality of the capacitive elements of the tool.

According to a second aspect, the present invention relates to a stimulation device comprising a stimulation tool according to any one of the embodiments of the invention, a power source connected to a first terminal and to a second terminal of the power supply port, and switching means adapted to place the tool in at least two states:
  a charging state wherein each capacitive element and the stimulation head are electrically in series between the first terminal and the second terminal of the power supply port, so that the power source charges each capacitive element through the stimulation head,
  a discharging state wherein each capacitive element discharges through the stimulation head.

In specific embodiments, the stimulation device comprises diagnostic means adapted to determine a state of the stimulation head according to a parameter representing the resistance of the stimulation head.

PRESENTATION OF FIGURES

Figure 2:
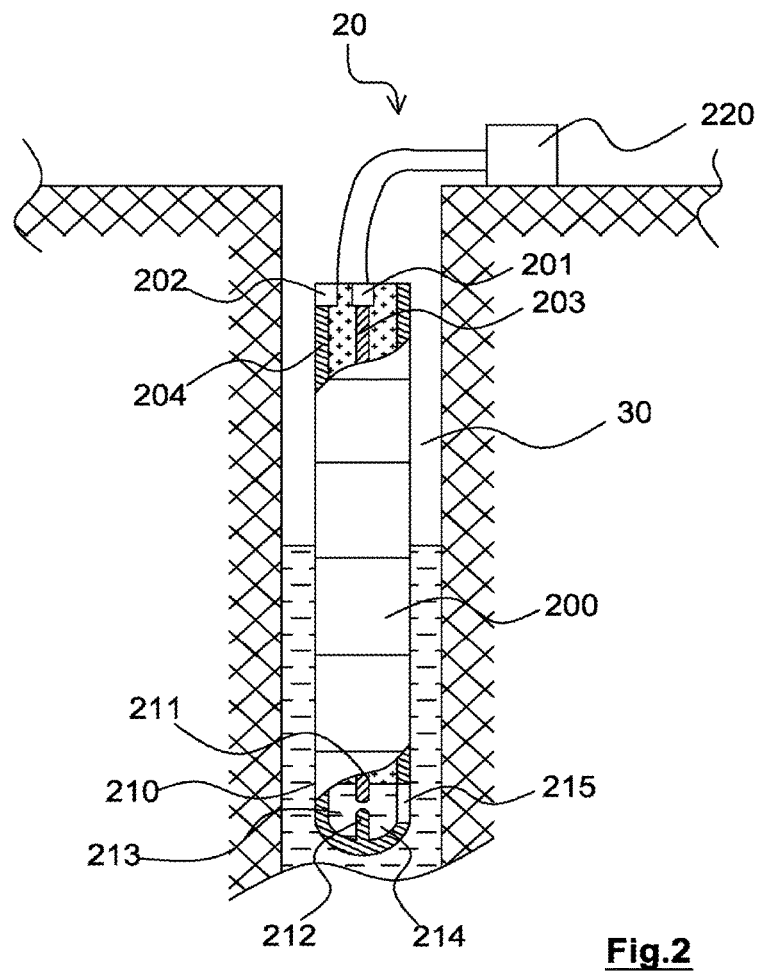
Figure 3:
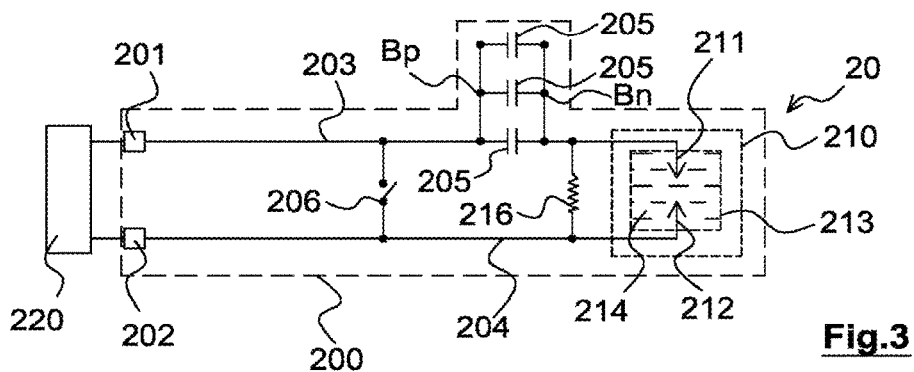
Figure 4:
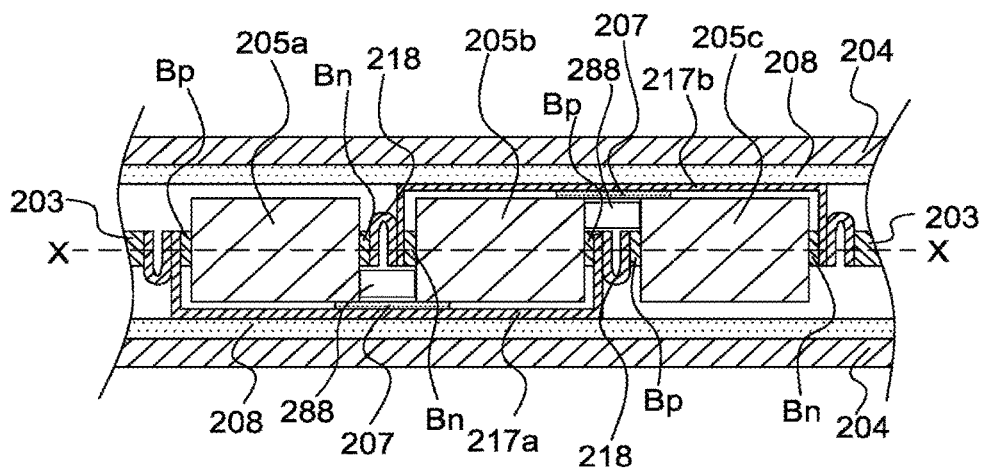
Figure 5:
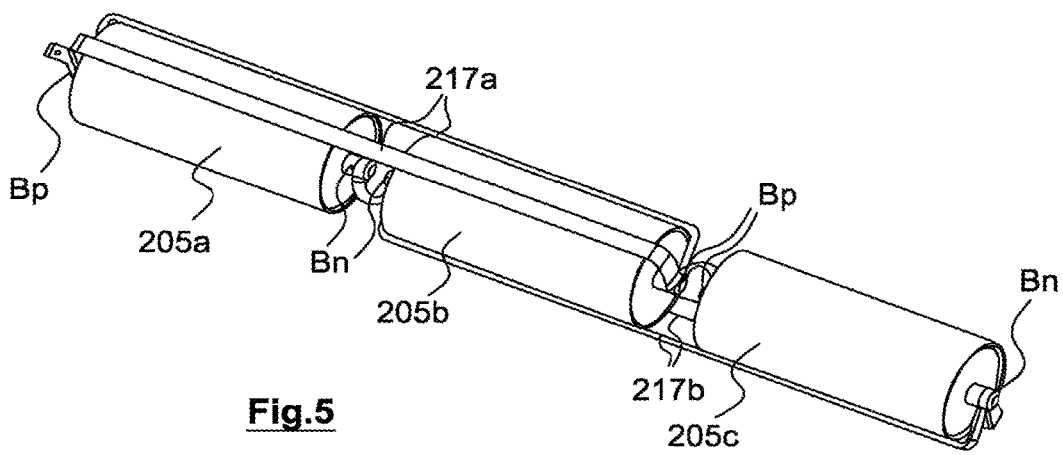

The invention will become more apparent in light of the following description given by way of non-limiting example and with reference to the figures which represent:

FIG. 1: already described, an electric circuit diagram of an exemplary embodiment of a device for the stimulation of underground resource extraction wells according to the prior art, FIG. 2: a half-sectional view of a stimulation device in position in an underground resource extraction well, FIG. 3: an electric circuit diagram of an exemplary embodiment of a stimulation device according to the invention, FIG. 4: a partial sectional view of an exemplary embodiment of a tool of a stimulation device according to the invention, FIG. 5: a partial perspective view of an embodiment variant of a tool of a stimulation device according to the invention.

In these figures, the same references from one figure to another denote identical or similar elements. For reasons of clarity, the elements depicted are not to scale unless otherwise specified.

DETAILED DESCRIPTION OF EMBODIMENTS

FIG. 2 schematically represents an example for implementing a well stimulation device 20 according to the invention.

The description that follows relates in a non-limiting manner to a stimulation device 20 implemented to improve the production of an underground resource extraction well. However, and as noted above, the term "well stimulation" is generally understood to mean the generation of an acoustic shock wave in a natural well or wellbore. Such well stimulation can be implemented to improve the production of an underground resource extraction well, but also to conduct a seismic study, and to fracture underground rock, etc.

As illustrated in FIG. 2, the stimulation device 20 comprises an elongated tool 200, adapted to be inserted into an extraction well 30 obtained by drilling. In specific embodiments, the tool 200 may be formed by a plurality of sections assembled end to end in a reversible manner.

More particularly, FIG. 2 represents a half-sectional view of the tool 200, wherein both ends of said tool 200 are shown in cross-section. The tool 200 also comprises, at a first end, a stimulation head 210, introduced downward into the extraction well 30, and a second end opposite said stimulation head 210.

The stimulation head 210 comprises a closed cavity 213 inside of which are located a first electrode 211 and a second electrode 212. The first electrode 211 and the second electrode 212 are separated by a fluid 214 contained inside the cavity 213. The cavity 213 is notably closed by a flexible wall 215 separating the fluid 214, located inside said cavity 213, and the underground resource, located outside said cavity. The fluid 214 is electrically conductive and can be considered as being a resistive element. Said fluid is a liquid such as water for example, with resistance in the order of 1000 ohms. According to other examples, there is nothing to exclude having a stimulation head 210 with an open cavity, in which case the fluid is the fluid contained downhole.

The description that follows relates to the case where the cavity 213 is closed. The theoretical value of the resistance of the fluid 214, i.e. the resistance of said fluid in the absence of stimulation head 210 damage, is designated hereinafter as $R_F$.

The tool 200 also comprises, at the second end for example, a supply port comprising a first terminal 201 and a second terminal 202. The first terminal 201 is connected to the first electrode 211 via a first circuit 203, and the second terminal 202 is connected to the second electrode 212 via a second circuit 204. In the non-limiting example illustrated in FIG. 2, the first circuit 203, e.g. a brass rod, corresponds at the second end to a central core of the tool 200. The second circuit 204, e.g. made of steel, corresponds to a peripheral wall of the tool 200.

The stimulation device 20 comprises a power source 220 connected to the first terminal 201 and to the second terminal 202 of the tool 200. The power source may be a current source, a voltage source, etc.

In the non-limiting example illustrated in FIG. 2, the power source 220 is external to the tool 200 and is connected to the first terminal 201 and to the second terminal 202 via an electric cable. According to other embodiments, there is nothing that excludes having a power source 220 built into the tool 200, for example. According to other embodiments, the power source 220 can also be only partially external to the tool 200, being distributed in two parts connected by an electric cable: a first part external to the tool 200 and a second part built into the tool 200 and connected to the first terminal 201 and to the second terminal 202 of said tool 200.

FIG. 3 represents an electric circuit diagram of the main electrical components of a specific embodiment of the tool 200. For reasons of clarity, the arrangement of said electrical components, i.e. the arrangement of said electrical components in the space, is not taken into account in FIG. 3.

As illustrated by FIG. 3, the first circuit 203 of the tool 200 comprises a plurality of capacitive elements between the power supply port and the stimulation head 210. In the non-limiting example illustrated in FIG. 3, the tool 200 comprises three capacitive elements 205a, 205b and 205c. According to other examples, there is nothing that excludes considering a different number of capacitive elements, greater than or equal to two.

Each capacitive element 205a-205c comprises two terminals of respectively different polarities arranged on respectively opposite connection faces of said capacitive element. By convention, the terminals of different polarity of each capacitive element 205a-205c are designated below by "positive terminal" Bp and "negative terminal" Bn, respectively.

The positive terminals Bp of the three capacitive elements 205a-205c are connected together and the negative terminals Bn of the three capacitive elements 205a-205c are connected together. Therefore, said capacitive elements 205a-205c are electrically in parallel.

FIG. 3 represents a preferred embodiment wherein the stimulation device 20 further comprises switching means adapted to place the tool 200 in at least two states:
- a charging state wherein the positive terminals Bp of the capacitive elements 205a-205c are connected to the first terminal 201 of the tool 200 and disconnected from the second electrode 212, and wherein the negative terminals Bn of said capacitive elements are connected to the first electrode 211,
- a discharging state wherein the positive terminals Bp of said capacitive elements 205a-205c are connected to the second electrode 212, and wherein the negative terminals Bn of the capacitive elements 205a-205c are connected to the first electrode 211.

In the non-limiting example shown in FIG. 3, the positive terminals Bp of the capacitive elements 205a-205c are connected directly to the first terminal 201 of the tool 200, and the negative terminals Bn of said capacitive elements 205a-205c are connected directly to the first electrode 211 of the stimulation head 210. "Connected to" means that an electric current can flow between the elements under consideration. "Connected directly to" means that the elements under consideration are connected without an intermediate electrical component.

In addition, the switching means comprise a switch 206 connected firstly to a point on the first circuit 203 located between the first terminal 201 of the tool 200 and the capacitive elements 205a-205c and, secondly, to a point on the second circuit 204 located between the second terminal 202 of the tool 200 and the second electrode 212 of the stimulation head 210. The switch 206 conventionally comprises an open state, wherein no electric current flows between the terminals of said switch 206, and a closed state, wherein an electric current can flow between said terminals of said switch 206.

When the power source 220 is connected to the first terminal 201 and to the second terminal 202 of the tool 200, it is therefore understood that:
- when the switch 206 is in the open state: each capacitive element 205a-205c and the stimulation head 210 are electrically in series between the first terminal 201 and the second terminal 202 of the tool 200, so that said power source 220 charges the capacitive elements 205a-205c through the stimulation head 210,
- when the switch 206 is in the closed state: the capacitive elements 205a-205c discharge through the stimulation head 210.

The transition of the switch from the open state to the closed state is, for example, performed when a predefined discharge condition is obtained. For example, said predefined condition is obtained when the voltage at the terminals of the switch 206 or the capacitive elements 205a-205c reaches a predetermined upper limit value. In such a case, the switch 206 is advantageously a spark-gap whose breakdown voltage is chosen to be equal to said predetermined upper limit value, so that the spark-gap will automatically transition to the closed state when the voltage on its terminals reaches said upper limit value. Other embodiments are possible, however. According to other non-limiting examples, the stimulation device 20 may comprise a control module that controls the switch 206 based on the voltage measurements at the terminals of said switch 206 or at the terminals of the capacitive elements 205a-205c.

It should be noted that the invention is applicable to electrical architectures other than that illustrated in FIG. 3, and is more generally applicable to all electrical architectures comprising a plurality of capacitive elements electrically in parallel with each other, including an electrical architecture of the type illustrated in FIG. 1. The electrical architecture of FIG. 3 is however advantageous insofar as, in the charging state, an electric current flows in the stimulation head 210 between the first electrode 211 and the second electrode 212. In this way, any change in the electrical properties of the stimulation head 210, and more specifically the resistance of the fluid 214 (transition from the theoretical value $R_F$ to a value $R_Z$), can in principle be detected by observing a representative parameter of said resistance of said fluid 214. The analysis of said parameter when the tool 200 is in the charging state thus makes it possible to determine a state of the stimulation head 210, for example to detect abnormal behavior likely to be caused, in the case of a closed cavity 213, by a rip in the flexible wall 215 of said cavity 213.

Preferably, the observed parameter is the power delivered to the tool 200 by the power source 220. Observing the power is advantageous, in the case of a power source 220 at least partially external to the tool 200, insofar as it may be carried out remotely from the tool 200 (on the surface), without having to add a dedicated voltage and/or current sensor in said tool 200.

In a preferred embodiment, also illustrated by FIG. 3, the tool 200 further comprises a resistive element 216 connected in parallel with the stimulation head 210, between a point on the first circuit 203 located between the capacitive elements 205a-205c and the first electrode 211, and a point on the second circuit 204 located between the second electrode 212 and the switch 206. The resistive element 216 preferably has a resistance $R_S$ at least two times greater than the theoretical value $R_F$ of the resistance of the fluid 214 separating the first electrode 211 from the second electrode 212. In this way, the charging current and the discharging current of the capacitive elements 205a-205c flow mainly through the fluid 214.

The resistive element 216 ensures that the intensity of the discharge current of the capacitive elements 205a-205c is always greater than a predetermined lower limit value. In the case, for example, of a rip in the flexible wall 215 of a closed cavity 213, external elements, from the extraction well, can enter the cavity 213 and modify the resistance of the fluid 214. Typically, the resistance of the fluid 214 can increase to a value $R_Z$ significantly higher than the theoretical value $R_F$. In such a case, the discharge of the capacitive elements 205a-205c is much slower or even impossible. Owing to the resistive element 216 connected in parallel with the stimulation head 210, the equivalent resistance of the assembly formed by said resistive element 216 and the stimulation head 210 is therefore always less than $R_S$, so that the capacitive elements 205a-205c can always be discharged.

FIG. 4 schematically represents the arrangement, in accordance with the invention, of three capacitive elements 205a-205c of the tool 200 of FIG. 3. As illustrated by FIG. 4, inside of the tool 200, the capacitive elements 205a-205c are arranged in series with their connection faces facing each other, and arranged such that the connection faces facing each other of each pair of adjacent capacitive elements 205a-205c correspond to terminals of the same positive Bp or negative Bn polarity.

It should be noted that, when the tool 200 is formed by a plurality of sections assembled end to end in a reversible manner, the three capacitive elements thus arranged are preferably installed in the same section.

More particularly, in the example illustrated by FIG. 4, the terminals of the capacitive elements 205a-205c are all aligned along the same longitudinal axis X. Along said longitudinal axis X, first there is the first capacitive element 205a, the positive terminal Bp of which is connected to the first circuit 203. The second capacitive element 205b is interposed between said first capacitive element 205a and the third capacitive element 205c. The connection face of the negative terminal Bn of the first capacitive element 205a faces the connection face of the negative terminal Bn of the second capacitive element 205b. The connection face of the positive terminal Bp of the second capacitive element 205b faces the connection face of the positive terminal Bp of the third capacitive element 205c. This is followed by, along said longitudinal axis X, the third capacitive element 205c, the negative terminal Bn of which is connected to the first circuit 203.

In addition, the remote terminals of the same polarity of each pair of adjacent capacitive elements 205a-205c (i.e. the terminals of the same polarity which are not arranged on connection faces facing each other) are also interconnected. For this reason, in FIG. 4, the positive terminal Bp of the first capacitive element 205a is connected to the positive terminals Bp of the second and third capacitive elements 205b, 205c, and the negative terminal Bn of the third capacitive element 205c is connected to the negative terminals Bn of the first and second capacitive elements 205a, 205b.

FIG. 4 shows that, owing to the arrangement of the capacitive elements 205a-205c, the distance between terminals of different polarity, between which the voltage is maximum, is always greater than the length of a capacitive element 205a-205c. The risk of electrical arcing between terminals of different polarities is therefore greatly reduced.

In preferred embodiments, the electrical connection means, connecting the remote terminals of the same polarity of each pair of adjacent capacitive elements 205a-205c, comprise at least one electrically conductive link extending along said pair of capacitive elements 205a-205c. In the example illustrated by FIG. 4, the tool 200 comprises two such electrically conductive links:
- a link 217a extending longitudinally along the lateral walls of the first and second capacitive elements 205a, 205b, to connect the positive terminals Bp,
- a link 217b extending longitudinally along the lateral walls of the second and third capacitive elements 205b, 205c, to connect the negative terminals Bn.

The link 217b is arranged on the side of the second capacitive element 205b opposite the link 217a in order to limit the risk of electrical arcing between said links 217a, 217b, connected to positive terminals Bp and to negative terminals Bn, respectively. With respect to the longitudinal axis X, the link 217a and the link 217b are radially spaced at an angle of 180°. Considering that each capacitive element 205a-205c is a cylinder of circular cross-section with radius R, the distance between the links 217a, 217b is equal to $\pi \cdot R$. According to other examples, there is nothing that excludes having a radial spacing of less than 180°. This radial spacing between links 217a, 217b, connecting terminals of respectively different polarities, is preferably equal to or greater than 60° in order to ensure that the distance between said links 217a, 217b is greater than R.

In a preferred embodiment, illustrated by FIG. 4, the tool 200 comprises electrical insulation means 207 between the links 217a, 217b and the lateral walls of the capacitive elements 205a-205c, at least at the junctions between adjacent capacitive elements. Said electrical insulation means 207 are sheets of polyethylene terephthalate (PET) or polyimide (PI) for example; such provisions can prevent the generation of an electric arc by creeping:
- between the link 217a connecting the terminals of positive polarity Bp of the first and second capacitive elements 205a, 205b on the one hand, and electrical connection means 218 of the terminals of negative polarity Bn of said first and second capacitive elements 205a, 205b on the other hand,
- between the link 217b connecting the terminals of negative polarity Bn of the second and third capacitive elements 205b, 205c on the one hand, and electrical connection means 218 of the terminals of positive polarity Bp of said second and third capacitive elements 205b, 205c on the other hand.

In the example illustrated by FIG. 4, the second circuit 204 forms a peripheral wall of the tool 200 inside of which are arranged the capacitive elements 205a-205c. In such a case, electrical insulation means 208 must be provided between said second circuit 204 and the links 217a, 217b. Said electrical insulation means 208 take the form, for example, of a winding of polyethylene terephthalate (PET) or polyimide (PI) sheets around said capacitive elements 205a-205c and said links 217a, 217b.

FIG. 5 represents an alternative embodiment wherein, for each pair of adjacent capacitive elements 205a-205c, the electrical connection means connecting the two remote terminals of the same polarity comprise two electrically conductive links 217a, 217b. Such provisions serve to introduce redundancy in electrical connections and reduce the equivalent inductance of the circuit.

More particularly, the positive terminal Bp of the first capacitive element 205a is connected to the positive terminal Bp of the second capacitive element 205b (and to the positive terminal Bp of the third capacitive element 250c) by two links 217a. The negative terminal Bn of the third capacitive element 205c is connected to the negative terminal Bn of the second capacitive element 205b (and to the negative terminal Bn of the first capacitive element 205a) by two links 217b.

In the example illustrated by FIG. 5, the links 217a connecting the positive terminals Bp are radially spaced by approximately 60°. The links 217b connecting the negative terminals Bn are equally radially spaced by approximately 60°. In addition, said links 217b connecting the negative terminals Bn are arranged on the side of the second capacitive element 205b opposite the links 217a connecting the positive terminals Bp, so that the minimum radial spacing between a link 217a connecting the positive terminals Bp and a link 217b connecting negative terminals Bn is approximately 120°.

More generally, the radial spacing between the links 217a, 217b connecting the terminals of the same polarity of each pair of adjacent capacitive elements 205a-205c may differ from 60°. In preferred embodiments, this radial spacing is between 10° and 90°, so that it is possible to ensure sufficient radial spacing between links 217a, 217b connecting terminals of respectively different polarities. In particular, by arranging the links 217a, on the one hand, and the links 217b, on the other hand, on both sides of the capacitive elements 205a-205c (as illustrated by FIG. 5), it is ensured that the minimum radial spacing between a link 217a connecting the positive terminals Bp and a link 217b connecting negative terminals Bn is at least 90°.

In an alternative embodiment of the tool 200 of FIG. 5, each link 217a connecting the positive terminals Bp is interposed between the links 217b connecting the negative terminals Bn. More particularly, the links 217a connecting the positive terminals Bp are radially spaced by approximately 180°, as are the links 217b connecting the negative terminals Bn. Furthermore, the links 217a connecting the positive terminals Bp are arranged transversely in relation to the links 217b connecting the negative terminals Bn. In this way, the radial spacing between each link 217a connecting the positive terminals Bp and the two links 217b connecting the negative terminals Bn is approximately 90°.

In specific embodiments, the links 217a, 217b connecting the remote terminals of the same polarity of each pair of adjacent capacitive elements 205a-205c, are rigid in order to also ensure the mechanical retention of said capacitive elements 205a-205c between themselves. According to other examples, there is nothing, however, that excludes having flexible links 217a, 217b. As necessary, the mechanical retention of the capacitive elements 205a-205c between themselves can be achieved by placing them inside a rigid peripheral wall (e.g. the second circuit 204 in the example illustrated in FIG. 4), inside of which is injected a resin (e.g. an epoxy resin).

The electrical connection means 218 connecting the terminals of the same polarity of connection faces facing each other can be rigid or flexible. In the example illustrated by FIGS. 4 and 5, these electrical connection means are flexible and take the form of electrically conductive foils.

Alternatively or in addition to the embodiments described above, the mechanical retention of the capacitive elements 205a-205c between themselves may be ensured by rigid spacers (schematically represented as elements 288 in FIG. 4) arranged between said capacitive elements 205a-205c. Such rigid spacers are preferably made of an electrically insulating material, such as a composite material of fiberglass-reinforced epoxy resin.

More generally, it should be noted that the implementation methods and embodiments considered above were described as non-limiting examples, and that other variations are consequently possible.

In particular, the invention has been described by considering three capacitive elements electrically in parallel. As noted above, the number of capacitive elements 205a-205c is not restrictive, and the invention is applicable when the tool 200 comprises at least two capacitive elements electrically in parallel.

In addition, according to other examples, the tool 200 may comprise several sets of capacitive elements, the capacitive elements being electrically in parallel with each other within the same set. In such a case, all that has been described above in reference to the three capacitive elements 205a-205c is implemented within at least one set of capacitive elements, and preferably within each set of capacitive elements. The different sets of capacitive elements for example are installed in separate sections of the tool 200. The capacitive elements of different sets may be indifferently arranged electrically in parallel or in series. For example, the tool 200 may comprise a plurality of sections each comprising a set of three capacitive elements.

The description above clearly illustrates that the present invention achieves the goals it has set by its various features and advantages. In particular, the stimulation tool 200 according to the invention makes it possible to limit the risk of electrical arcing upstream of the stimulation head 210, owing to an advantageous arrangement of capacitive elements 205a-205c electrically in parallel.

The invention claimed is:

1. A tool for the stimulation of wells, comprising:
   an electric power supply port;
   a stimulation head; and
   at least two capacitive elements between said power supply port and said stimulation head,
   each capacitive element comprising two terminals of respectively different polarities arranged on respectively opposite connection faces of said capacitive element,
   wherein respective terminals of said capacitive elements having a same polarity are connected together such that said capacitive elements are electrically in parallel in a charging state and in a discharging state,
   wherein the capacitive elements of the tool are arranged in series with their connection faces facing each another, and such that the connection faces facing each other of each pair of adjacent capacitive elements correspond to terminals of the same polarity, and
   wherein spacers are arranged between said adjacent capacitive elements.

2. The tool as claimed in claim 1, wherein remote terminals of a same polarity of each pair of adjacent capacitive elements are connected by at least one link extending along said pair of adjacent capacitive elements.

3. The tool as claimed in claim 2, further comprising at least three capacitive elements, and wherein the links between the terminals of different polarities of a same capacitive element to respective terminals of other capacitive elements are spaced apart radially by an angle equal to or greater than 60°.

4. The tool as claimed in claim 2, wherein the remote terminals of the same polarity of each pair of adjacent capacitive elements are connected by two links extending along said pair of adjacent capacitive elements and radially spaced by an angle equal to 180° or between 10° and 90°.

5. The tool as claimed in claim 2, further comprising electrical insulation means between each link of each pair of adjacent capacitive elements and electrically connecting means of the terminals of the same polarity of the connection faces facing each other of said pair of adjacent capacitive elements.

6. The tool as claimed in claim 2, wherein each link connecting the remote terminals of the same polarity of each pair of adjacent capacitive elements is rigid.

7. The tool as claimed in claim 2, wherein each link connecting the remote terminals of the same polarity of each pair of adjacent capacitive elements is flexible, and wherein the capacitive elements are retained inside a rigid peripheral wall of the tool by a resin.

8. A tool for the stimulation of wells, comprising:
an electrically conductive peripheral wall;
an electric power supply port;
a stimulation head; and
at least two capacitive elements between said power supply port and said stimulation head,
each capacitive element comprising two terminals of respectively different polarities arranged on respectively opposite connection faces of said capacitive element,
wherein respective terminals of said capacitive elements having a same polarity are connected together such that said capacitive elements are electrically in parallel in a charging state and in a discharging state,
wherein the capacitive elements of the tool are arranged in series with their connection faces facing each another, and such that the connection faces facing each other of each pair of adjacent capacitive elements correspond to terminals of the same polarity, and
wherein the capacitive elements are arranged within the electrically conductive peripheral wall, and
wherein an electrical insulation means is provided between said electrically conductive peripheral wall and said capacitive elements.

9. The tool as claimed in claim 1, wherein it is formed by a plurality of sections assembled end to end in a reversible manner, one of the sections comprising a plurality of the capacitive elements of the tool.

10. A well stimulating device, comprising:
a tool that includes an electric power supply port, a stimulation head, and at least two capacitive elements between said power supply port and said stimulation head,
each capacitive element comprising two terminals of respectively different polarities arranged on respectively opposite connection faces of said capacitive element,
respective terminals of said capacitive elements having a same polarity being connected together such that said capacitive elements are electrically in parallel in a charging state and in a discharging state, and
the capacitive elements of the tool being arranged in series with their connection faces facing each another, and such that the connection faces facing each other of each pair of adjacent capacitive elements correspond to terminals of the same polarity;
an electrical source connected to a first terminal and to a second terminal of the power supply port; and
switching means adapted to place the tool in at least two states:
a charging state wherein each capacitive element and the stimulation head are electrically in series between the first terminal and the second terminal of the power supply port, so that the power source charges each capacitive element through the stimulation head,
a discharging state wherein each capacitive element discharges through the stimulation head,
wherein the stimulation head comprises a cavity inside of which are located a first electrode and a second electrode, and
wherein, in the charging state, the power source charges each capacitive element, through a fluid in the cavity where a current flows from the first electrode to the second electrode.

11. The tool as claimed in claim 8,
wherein remote terminals of a same polarity of each pair of adjacent capacitive elements are connected by at least one link extending along said pair of adjacent capacitive elements, and
wherein the remote terminals of the same polarity of each pair of adjacent capacitive elements are connected by two links extending along said pair of adjacent capacitive elements and radially spaced by an angle equal to 180° or between 10° and 90°.

12. The tool as claimed in claim 8,
wherein remote terminals of a same polarity of each pair of adjacent capacitive elements are connected by at least one link extending along said pair of adjacent capacitive elements, and
wherein each link connecting the remote terminals of the same polarity of each pair of adjacent capacitive elements is flexible, and wherein the capacitive elements are retained inside a rigid peripheral wall of the tool by a resin.

13. The tool as claimed in claim 8, wherein it is formed by a plurality of sections assembled end to end in a reversible manner, one of the sections comprising a plurality of the capacitive elements of the tool.

14. The well stimulating device as claimed in claim 10,
wherein remote terminals of a same polarity of each pair of adjacent capacitive elements are connected by at least one link extending along said pair of adjacent capacitive elements, and
wherein the remote terminals of the same polarity of each pair of adjacent capacitive elements are connected by two links extending along said pair of adjacent capacitive elements and radially spaced by an angle equal to 180° or between 10° and 90°.

15. The well stimulating device as claimed in claim 10,
wherein remote terminals of a same polarity of each pair of adjacent capacitive elements are connected by at least one link extending along said pair of adjacent capacitive elements, and
wherein each link connecting the remote terminals of the same polarity of each pair of adjacent capacitive elements is flexible, and wherein the capacitive elements are retained inside a rigid peripheral wall of the tool by a resin.

16. The well stimulating device as claimed in claim 10, wherein the tool is formed by a plurality of sections assembled end to end in a reversible manner, one of the sections comprising a plurality of the capacitive elements of the tool.

* * * * *